(12) United States Patent
Hadi Salim

(10) Patent No.: US 8,654,772 B2
(45) Date of Patent: *Feb. 18, 2014

(54) PROGRAMMABLE PACKET SWITCHING DEVICE

(75) Inventor: Jamal Hadi Salim, Nepean (CA)

(73) Assignee: Avaya Inc., Basking Ridge, NJ (US)

( * ) Notice: Subject to any disclaimer, the term of this patent is extended or adjusted under 35 U.S.C. 154(b) by 2264 days.

This patent is subject to a terminal disclaimer.

(21) Appl. No.: 10/336,479

(22) Filed: Jan. 3, 2003

(65) Prior Publication Data

US 2003/0112811 A1     Jun. 19, 2003

Related U.S. Application Data

(63) Continuation of application No. 09/090,285, filed on Jun. 4, 1998, now Pat. No. 6,628,653.

(51) Int. Cl.
    *H04L 12/56*       (2011.01)
(52) U.S. Cl.
    USPC .................................................. 370/395.32
(58) Field of Classification Search
    USPC ........................ 370/392, 389, 471, 401, 235
    See application file for complete search history.

(56) References Cited

U.S. PATENT DOCUMENTS

| | | | | |
|---|---|---|---|---|
| 4,644,351 | A * | 2/1987 | Zabarsky et al. | 340/7.21 |
| 5,539,736 | A * | 7/1996 | Johnson et al. | 370/402 |
| 5,951,651 | A * | 9/1999 | Lakshman et al. | 709/239 |
| 6,041,054 | A * | 3/2000 | Westberg | 370/389 |
| 6,111,874 | A * | 8/2000 | Kerstein | 370/389 |
| 6,128,294 | A * | 10/2000 | Oura et al. | 370/389 |
| 6,275,491 | B1 * | 8/2001 | Prasad et al. | 370/389 |
| 6,321,260 | B1 * | 11/2001 | Takeuchi et al. | 709/223 |
| 6,549,519 | B1 * | 4/2003 | Michels et al. | 370/238 |
| 6,553,000 | B1 * | 4/2003 | Ganesh et al. | 370/235 |

* cited by examiner

*Primary Examiner* — Yong Zhou
(74) *Attorney, Agent, or Firm* — Anderson Gorecki & Rouille LLP

(57) ABSTRACT

A packet processing apparatus comprises a programmable hardware discriminator for receiving incoming packets, and selecting bits from any part of the incoming packets, a decision table for storing information relating to how the packets are to be processed, programmable hardware searching logic for accessing the information in the table according to the selected bits, and a packet handler for processing the packets according to the result of the access. Since many networking processing tasks can be broken down into bit selection and table searching, this generic type of arrangement will suit a wide variety of applications. It facilitates developing logic directly in hardware which can reduce the effort needed to convert a working prototype into a product ready for use in the field, e.g. for handling new protocol components.

16 Claims, 14 Drawing Sheets

PROGRAMMABLE PACKET SWITCHING DEVICE

CROSS-REFERENCE TO RELATED APPLICATIONS

This application is a Continuation of U.S. patent application Ser. No. 09/090,285, titled Programmable Packet Switching Device, filed Jun. 4, 1998, now issued as U.S. Pat. No. 6,628,653.

BACKGROUND TO THE INVENTION

1. Field of the Invention

The invention relates to packet processing apparatus, to methods of reconfiguring a packet processor, and to methods of using a packet processor.

2. Background Art

It is known to transmit data in packets, each packet having header information as part of the packet, for use in processing the packet. The location and meaning of the header information within each packet is defined by a protocol. Most packet data transmission networks use multiple layers of protocols, in a hierarchy, according to the well known ISO model. Starting with the raw data from a top level application, each protocol adds its own header information to that added previously by preceding (higher) protocols. In the course of transmission through the network, the packet may pass through and be routed, forwarded switched or processed according to information stored in various parts of the packet header, depending on which level of the various levels of protocols, is being used.

Conventionally, in a router or switch operating according to a given one of the protocols, for each incoming packet, particular bits in the header relating to that given protocol are examined. The packet would be routed using those bits and passed to a chosen output port. Dedicated hardware is often used for speed of operation.

New types of protocol processing using different parts of header or payload information with different meanings, are always being proposed, at all different layers, to meet new requirements for e.g. quality of service, billing functions, error handling, grouping of packets, prioritizing, and so on. However, development of appropriate hardware is time consuming, even when groups of programmable logic chips are used, for a number of reasons. Connections between such chips must be defined and fixed, and changes made to the relatively complex logic which is often involved, will often have consequences to other parts of the logic, which are difficult to manage.

Software simulations and verifications of hardware designs can be carried out, but often do not reveal all the problems of a real hardware implementation.

Programmable chips for switching packets of particular protocols are known, e.g. ethernet switching chips, and protocol-specific dedicated router chips. Such router chips can extract destination information from a packet using hard-coded logic to achieve higher speed or throughput. They use a routing table whose entries can programmed from an external host.

A chipset produced by Obtek provides multiprotocol packet routing. A programmable filter examines the contents of each incoming packet to derive the buried protocols and retrieve source and destination addresses. The filter passes a packet descriptor to a routing systems control chip which manages memory allocation, input and output queues. This filter is programmable using a proprietary language, a rule-based language which enables a programmer to define actions to be taken according to recognition of bits in a packet. As the filter's active structure parses and processes the unknown incoming packet, it is capable of activating other processors (including a host) or special hardware (for very high performance) to perform concurrent and supporting tasks.

SUMMARY OF THE INVENTION

It is an object of the invention to provide improved methods and apparatus.

According to a first aspect of the invention there is provided a packet processing apparatus comprising:

a programmable hardware discriminator for receiving incoming packets, and selecting bits from any part of the incoming packets;

a decision table for storing information relating to how the packets are to be processed;

programmable hardware searching logic coupled to the decision table and to the discriminator for accessing the information in the table according to the selected bits; and a packet handler coupled to the searching logic, for processing the packets according to the result of the access.

Advantages include the following:

a) Providing programmable table searching logic means that the search algorithm and any corresponding table maintenance functions can be altered without necessarily altering the table contents, or the bit selection hardware. This separation of these functions can make it easier to develop and refine applications using new protocol components, since changes to algorithms can be made more directly, at a lower level. It may enable applications to be developed to run faster, or use memory more efficiently for example. This was not possible in previous arrangements in which it was only possible to define the overall outputs of such algorithms for given states of the bits selected from the packet, without being able to define how the selected bits were processed, or how a table of all the possible outputs is searched.

b) Since many networking processing tasks can be broken down into bit selection and table searching, this generic type of arrangement will suit a wide variety of applications.

c) Having the bit selection function programmable, and able to select bits from any part of the incoming packets enables a wider range of operations using different protocols to be handled. This also makes it easier to interface with different input line interfaces, and enables subsequent processing to be streamlined, if all the necessary information in the packet can be extracted in one step.

d) Providing the table searching logic in hardware enables the speed of operation to be faster than equivalent software, and makes it easier for the developer to resolve timing issues in the design.

e) Developing logic directly in hardware can reduce the effort needed to convert a working prototype into a product ready for use in the field, and thus reduce the all important time to market for a product. The arrangement could be used in networks which are designed to be reconfigurable in operation, e.g. active networks which may be reconfigured to suit traffic conditions.

f) Having a programmable search algorithm enables the algorithm to be tailored to reduce search times, and improve throughput, for example by using the minimum number of bits or columns in the table necessary for searching, according to the application.

g) Having an explicit table can make it easier to maintain the contents of the table if it can be accessed directly. This is in contrast to previous arrangements having an implicit table not accessible directly, but defined by mappings of output for a given state of bits selected from the packet. If there are many such mappings having the same output, then any change in that one output would require changing all the mappings which mention that output. Having direct access to the table enables one table entry to be changed which may be simpler and quicker than changing multiple mappings in such a case.

Preferably the apparatus further comprises at least one packet output port, and the packet handler comprises a programmable hardware interpreting logic coupled to the packet output port, for interpreting the result of the access, to control the packet output port.

An advantage of providing a programmable interpreting logic is that the reaction to the result of the table search can be separately programmed, without necessarily altering other elements.

Preferably the interpreting logic is arranged to react to both a match and a mismatch result.

An advantage of being able to program action on a mismatch is that it broadens the range of applications to cover for example those in which a mismatch result can be used to alter the table, or to broadcast a packet. This is significant for following the "route once, switch many" principle, which means where a packet is received, if the table does not include its destination, it may be routed by for example a host CPU based routing algorithm, or by broadcasting to neighbouring nodes, but thereafter, the table learns the destination, and the remaining packets can be switched without the lengthy delay of using the CPU, or the inefficiency inherent in broadcasting.

Preferably the programmable hardware searching logic being arranged to be reprogrammable while in operation without interrupting the accessing of the information in the table.

One advantage is that changes or upgrades can be made more easily, without needing to reinitialize the system. In field applications, maintenance or upgrades become easier, since service can be maintained without interruption. Furthermore, it makes the apparatus more suitable for use as an active node in an active network, since the node can be reconfigured more easily with less likelihood of disrupting service.

Preferably, the apparatus further comprises a table maintenance means coupled to the decision table to modify the decision table according to parameters derived from the incoming packets.

An advantage of being able to modify the table from incoming packets is that the apparatus can better cover applications in which the table must be self learning. This feature is also significant for following the "route once, switch many" principle. This applies whether the table maintenance means receives the derived parameters from the host CPU or whether it receives the packets and derives the parameters itself.

Preferably the table maintenance means comprises programmable hardware logic for deriving the parameters from the incoming packet. An advantage of this, is that such modifications can be made more quickly than if the host CPU makes the derivation.

Preferably the apparatus further comprises at least one packet output port, and the packet handler comprises programmable hardware interpreting logic coupled to the packet output port, for interpreting the result of the access, to control the packet output port, the table maintenance means being coupled to the interpreting logic, and being arranged to modify the decision table on the basis of an output of the interpreting logic. An advantage of such an arrangement is that self learning of the table resulting for example from null search results, can be carried out more quickly than if the host CPU needs to be invoked.

Preferably the apparatus further comprises a host processor, the table maintenance means being coupled to the host processor and being arranged to modify the decision table on the basis of an output of the host processor. An advantage is the greater flexibility enabled by having the host CPU control the operation.

Preferably the discriminator further comprises a comparator for receiving the incoming packets, and comparing at least a portion of each packet with predetermined data, to identify particular types of packet from the incoming packets, the table maintenance means being coupled to the comparator and being arranged to modify the decision table on the basis of an output of the comparator. An advantage of being able to modify the table upon identification of a predetermined packet is that protocols which include packets carrying routing information for example, can be handled more quickly than if they must be passed to the host CPU.

Preferably the discriminator further comprises a comparator for receiving the incoming packets, and comparing at least a portion of each packet with predetermined data, to identify particular types of packet from the incoming packets, and process the packet according to its type. An advantage is that packets destined for the host CPU for example, can be routed there directly without the delay and additional processing overhead of a table search.

Preferably the programmable hardware searching logic is arranged to access concurrently the information in the table relating to a plurality of the incoming packets. An advantage arising is an increase in throughput for what may otherwise be a bottleneck, particularly if the table is large.

Preferably the packet handler further comprises a packet switching fabric.

Preferably the apparatus is part of a programmable packet filter.

Preferably the apparatus is part of a programmable node in an active network.

According to a further aspect of the invention there is provided a packet processing apparatus comprising:

a programmable hardware discriminator for receiving incoming packets, and selecting bits from any part of the incoming packets;

a programmable hardware table processor coupled to the discriminator and comprising a decision table containing information relating to how the packets are to be processed, the processor further comprising hardware searching logic for accessing the information in the table according to the selected bits;

a packet handler coupled to the table processor, for processing the packets according to the accessed information; and and a means to modify the decision table according to parameters derived from the incoming packets.

According to a further aspect of the invention there is provided a method of reconfiguring a packet processor, the packet processor comprising:

a programmable hardware discriminator for receiving incoming packets, and selecting bits from any part of the incoming packets;

a decision table containing information relating to how the packets are to be processed; and programmable hardware searching logic coupled to the decision table and to the discriminator for accessing the information in the table according to the selected bits; the method comprising the steps of:

determining a column structure for the decision table;
determining which bits to select from each packet;
determining a correspondence between the selected bits and the columns of the table;
determining which bits are to be used in the search;
deriving a new configuration for the discriminator on the basis of the determination of which bits to select;
deriving a new configuration for the searching logic on the basis of the column structure, which bits are to be used in the search, and the correspondence; and
loading the new configurations into the searching logic, and the discriminator respectively.

According to a further aspect of the invention there is provided a method of reconfiguring a packet processor, the packet processor comprising:

a programmable hardware discriminator for receiving incoming packets, and selecting bits from any part of the incoming packets;

a decision table containing information relating to how the packets are to be processed; and programmable hardware searching logic coupled to the decision table and to the discriminator for accessing the information in the table according to the selected bits; the method comprising the steps of:

receiving incoming packets, and using the packet processor to recognise an incoming packet which indicates that the processor should be reconfigured;

deriving from the incoming packet new configurations for at least one of the discriminator, the searching logic, and the decision table.

According to a further aspect of the invention there is provided a method of using the above mentioned packet processor apparatus.

Any of the preferred features may be combined, and combined with any aspect of the invention, as would be apparent to a person skilled in the art. Other advantages will be apparent to a person skilled in the art, particularly in relation to prior art other than that mentioned above.

To show, by way of example, how to put the invention into practice, embodiments will now be described in more detail, with reference to the accompanying drawings.

DETAILED DESCRIPTION

The term packet is intended to encompass any bounded data unit, such as ATM (Asynchronous transfer Mode) cells, frame relay frames, ethernet frames, T1 data units, and IP packets. The term programmable is intended to encompass hardware whose function can be changed by programming all or part of a chip, or by changing the contents of registers, or by changing control inputs.

FIG. 1, Prior Art

Figure 1:
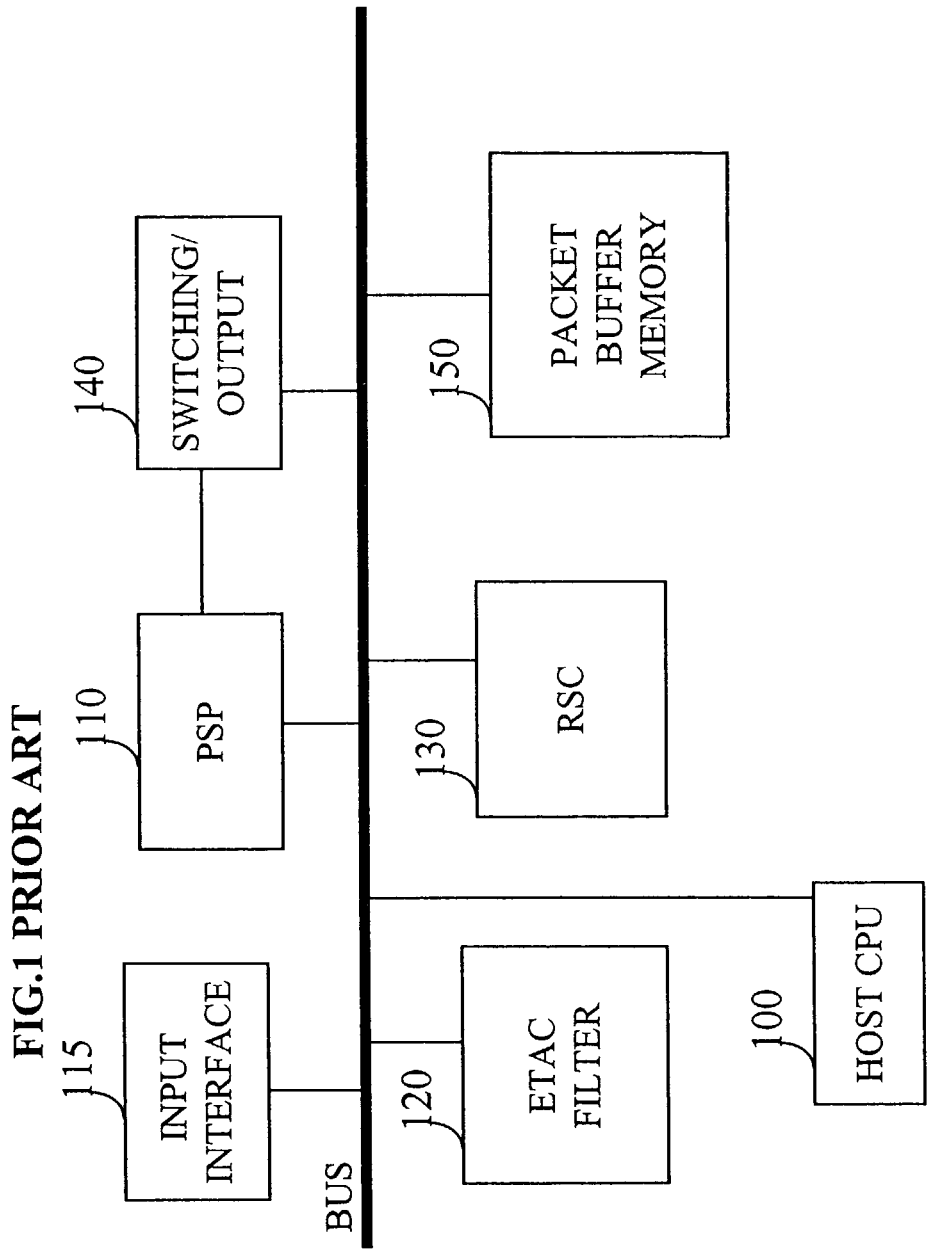
FIG. 1 shows a prior art arrangement.

FIG. 1 shows in schematic form a known arrangement based on a router using Obtek chips. The main components are the PSP 110 (Packet Script Processor), the RSC (Routing Systems Controller) 130, and the ETAC filter 120. Additional components shown, include a host CPU 100, an input interface 115, a switch and output interface 140, and packet buffer memory 150. The input interface separates the packet headers, and feeds them to the ETAC filter. The ETAC filter can be programmed to identify protocols, addresses, subnets, or implement firewalls, from packet headers. The routing system controller receives descriptors produced by the ETAC filter, and manages memory allocation, input and output queues, and other network management tasks.

The PSP controls the output of packets through the switch 140, and may make alterations to outgoing packets based on input received from the ETAC. The ETAC can be programmed to recognise predetermined bits or a signature of bits in the header, and map them into a descriptor, which indicates how the packet is to be processed. This descriptor is sent to the RSC. Furthermore, although there is a programming language to enable a developer to specify a mapping, there is no way to program how the mapping is achieved within the chip. There is no explicit table, but the mappings result in an implicit table. Thus self learning of table elements or any other action as a consequence of mismatches apparently cannot be programmed. Furthermore, with no explicit table, table maintenance is more difficult.

Figure 2:
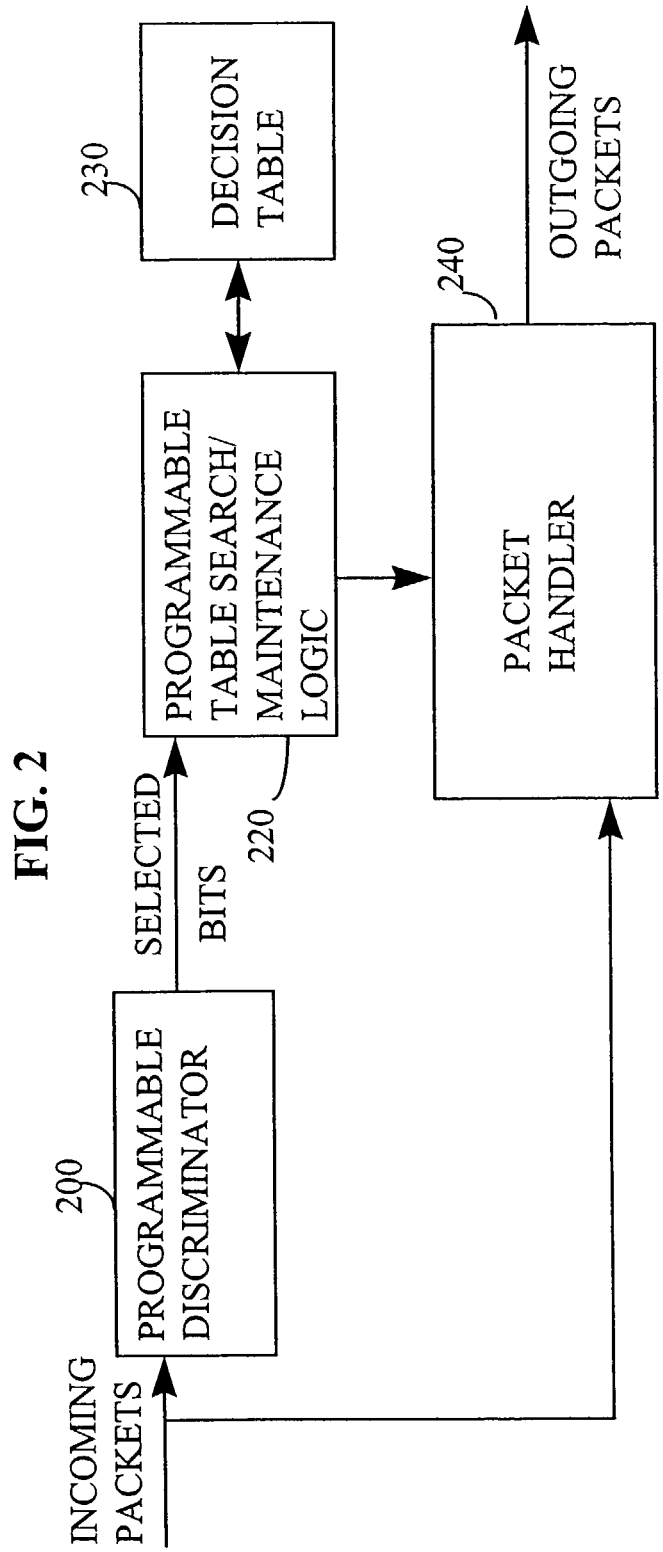
FIG. 2 shows processing apparatus according to an embodiment of the invention.

FIG. 2—Embodiment of the Invention

FIG. 2 Shows the principal elements in schematic form.

A programmable discriminator 200 selects bits from incoming packets. These are used by programmable table search logic 220, to access a decision table 230. The results of this access are ultimately used by the packet handler 240 for processing packets. Some examples of how the individual elements can be implemented, and examples of how the arrangement can be used in various applications, will be described below. The packet handler may be exemplified by programmable interpreting logic as described below, or by other circuitry for passing the table output directly to a packet switch or packet filter for example. In the case of this other circuitry, there may be no need for it to be programmable, and the table output may indicate directly an output port for the packet, or a go/no go instruction, also described in more detail below.

Figure 3:
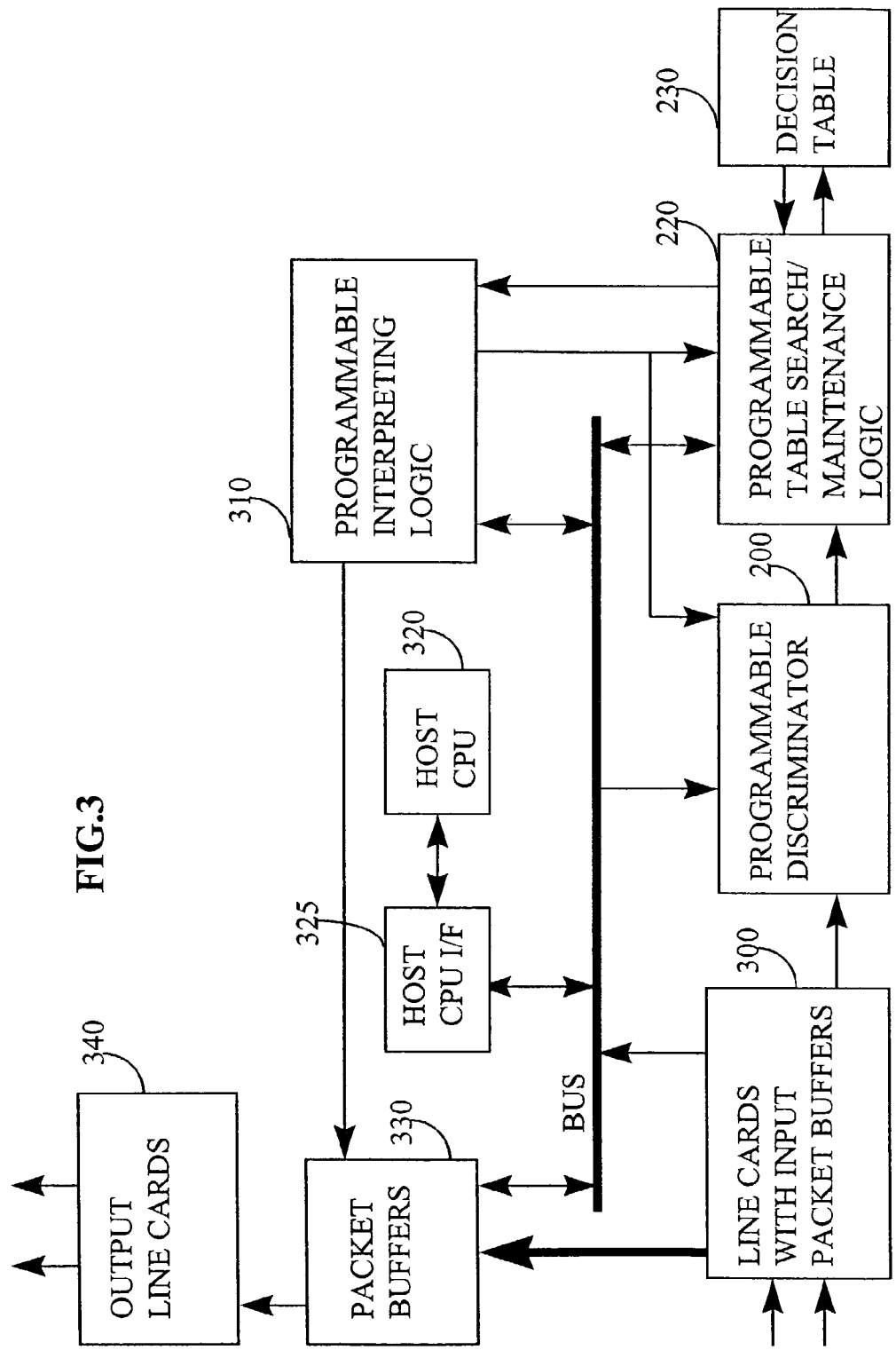
FIG. 3 shows an example of the apparatus of FIG. 2.

FIG. 3—Example of the Embodiment of FIG. 2

FIG. 3 shows the programmable discriminator 200, the programmable table search/maintenance logic 220 and the decision table 230 of FIG. 2, and in addition shows other surrounding elements. Line cards 300 with input packet buffers handle physical and data link layer protocols, and feed incoming packets to the programmable discriminator. These line cards will make the necessary conversion from whichever physical hardware is used for the data transmission. Packets are also fed directly to packet buffers 330, where they may be queued, ready for output on appropriate output line cards illustrated as 340. In practice, the output and input line card functions are usually merged onto a single card.

A host CPU 320 is connected to the principal elements via an interface 325, for the purpose of managing and maintaining these elements, and for providing high level application functions, depending on the purpose of the apparatus.

The apparatus as shown in FIG. 3 would be configurable for use as a packet filter, or a bridge between networks, or as a router, for example. It could be used for developing new configurations for the hardware, to develop new protocol components, or new application features. In principle, the same hardware configuration could then be taken and used in the field, to minimize the time to market.

Connected to the programmable table search/maintenance logic is a programmable interpreting logic 310 which is for interpreting the results of the table search. This element will be described in more detail below, with reference to FIG. 6. Outputs of this logic are shown going back to the programmable table search/maintenance logic, to the packet buffers 310, and to the programmable discriminator 200 as well as to the host CPU. This is one of the ways of making the whole system reconfigurable on the basis of incoming packets. For example, depending on the results of the search, the interpreting logic may trigger adaptation or switching to particular destination output line cards, of packets in the packet buffers 330. Alternatively, registers or control lines in the programmable discriminator or the programmable table search/maintenance logic may be changed, to change or extend the operation of these blocks. Furthermore, the interpreting logic can make changes in the decision table, via the table maintenance logic.

The host CPU 320 may perform housekeeping tasks for other elements, and, in service, it may be connected via other parts (not shown) to remote centralized network management systems. Reconfiguration in the field may be triggered by instructions sent from such remote systems to the host CPU. Alternatively, the host CPU may monitor local conditions and initiate reconfiguration on that basis.

When being used in experimental set-ups, a separate general purpose CPU (not shown) with a general purpose operating system may be used to run compilers for developing programs for the various programmable elements in the apparatus. Alternatively, such development could be carried out remotely and compiled programs downloaded to the host CPU across the network. In both cases, the host CPU could carry out authentication, verification and validation, before such programs are downloaded to the programmable elements.

The programmable hardware elements, the discriminator 200, the table search/maintenance logic, and the interpreting logic, may be implemented in any form of programmable hardware. Preferably it should be electronically programmable hardware, such as field programmable gate arrays (FPGA). Alternatives would include other programmable logic arrays to provide Boolean logic where appropriate, being programmable by setting control lines, or registers, as appropriate. Another alternative would be the provision of micro-controllers or digital signal processors, or microprocessors dedicated to performing these tasks at comparable rates to rates achieved by other hardware implementations.

The decision table 230 may be implemented in RAM, or in CAM (Content Addressable Memory) as appropriate. Conventional applications for routing tables involve either RAM tables, requiring two-stage look-up, or hashing again using RAM. Hashing may result. in collisions, leading to non-deterministic set-up times, and also has limited flexibility of address allocations. RAM tables lose speed through the two-stage look-up, and result in limited flexibility in address allocation. CAMs represent the ultimate in flexibility and convenience but have poor capacity at present. CAMs normally have a fixed maximum width for the combination of the match field and output field, e.g. 64 bits in the MCM 69C232. This limits the programmability, which may limit the range of applications.

CAMs are widely available, the Motorola MCM 69C232 is one example suitable for communications applications. A data input word is read in and compared to all the entries in a table. If a match is found, the data associated with the matching entry is output. The width of the match field and the output field are programmable. Inserting new table entries can be carried out without interrupting matching operations.

Equivalent functions including the table could be provided entirely within an FPGA, by using comparative and control logic, and storage elements for example, but at the cost of limiting the size of the table severely, since current FPGAs have limited size. For more genericity, a two stage search algorithm is preferred, the first stage being used to generate an address in memory, the second stage. involving using the address to access a table element. The first stage could be implemented in an FPGA or possibly using a CAM, while the second stage is preferably implemented in fast RAM to achieve faster access without limiting the table size or structure. The generation of the address in the FPGA might be achieved by selection logic or by look up table, or hash table functionality, or other algorithm which can be set up in the FPGA.

The capabilities of the FPGA will limit the range of possibilities. However the use of an FPGA to interface with the RAM, means that as better RAM becomes available, the FPGA can be reprogrammed with an interface to suit the new RAM, to provide an upgrade path. The choice of which components such as FPGAs to use, and how to interconnect them with RAM or CAM, and with each other, would be a matter of design implementation which would be within the capabilities of one skilled in the art, and so need not be described here in more detail.

The various programmable elements may communicate with each other by means of messages, rather than hard wired interfaces, to increase flexibility. Suitable messaging formats are well known, and need not be described here in more detail.

Figure 4:
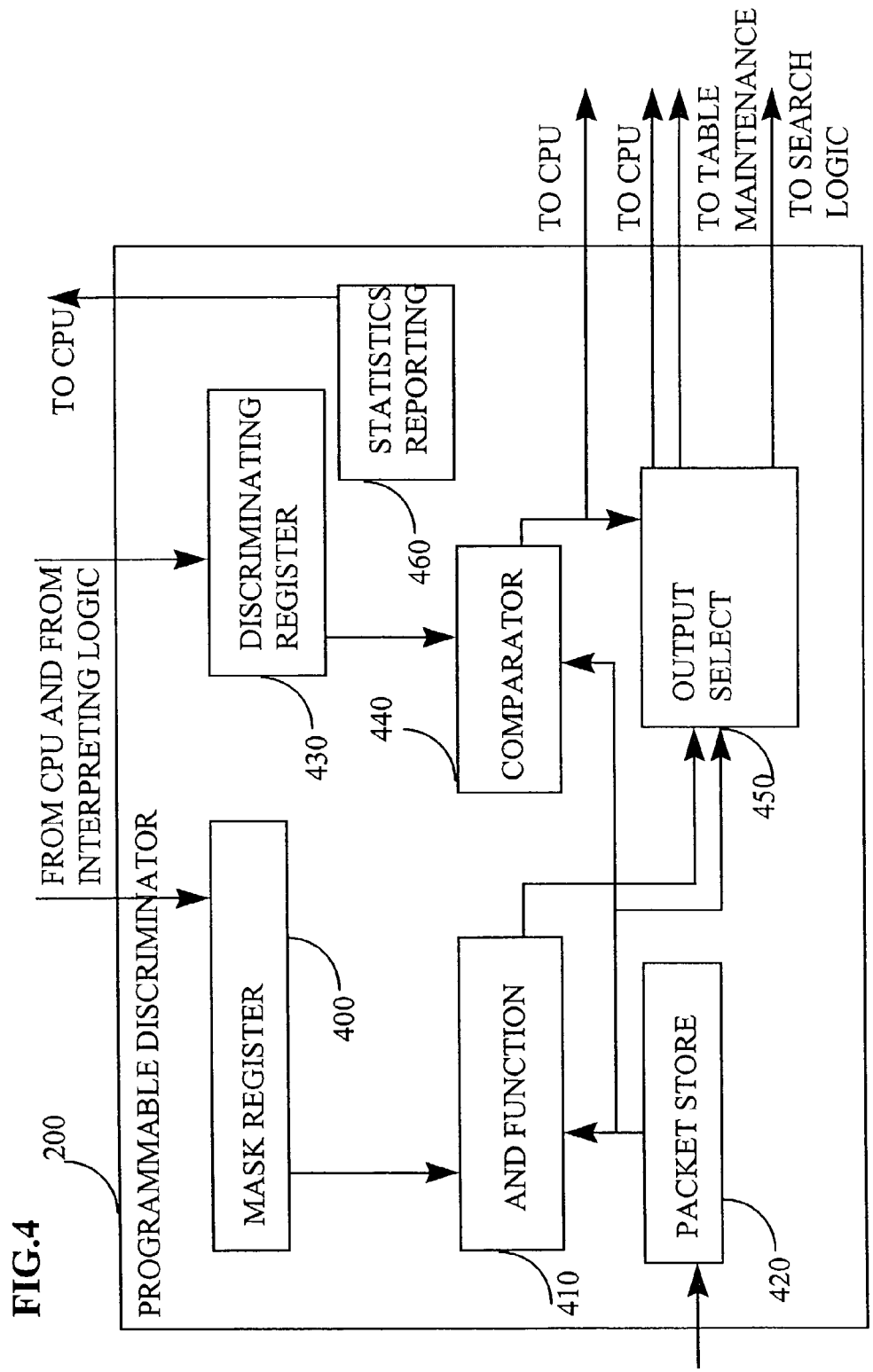
FIG. 4 shows an example of the programmable discriminator of FIG. 2 or 3.

FIG. 4—Programmable Discriminator Embodiment

FIG. 4 shows an example to illustrate some of the functions which may be configured in the programmable discriminator. A packet store 420 receives packets, which are logically ANDed by AND function 410, with the contents of a mask register 400, to output selected bits of the packet to output selector 450. The mask register 400 may be set by the host CPU or by the above-mentioned interpreting logic.

The selected bits may be in the form of several groups of bits, corresponding to particular sections of the packet, and may be output directly to the search logic, or may be passed to the host CPU, or conceivably to the table maintenance logic, if, for example, the packet is determined to be one which is to be used to alter the table entries directly.

As well as the bit selection function, the discriminator may have a bits recognition function. This is show in the form of a comparator 440, which compares the contents of the packet store, or part of the packet store, to predetermined data set-up in a discriminating register 430. The output of the comparator, indicating whether a match is found, may be output directly to the host CPU. This would enable packets destined for the host CPU to be sent there directly without leaving a table search. Furthermore, this would enable recognition of packets which are intended to directly alter the decision table. In this case, all or-part of the packet itself could be sent to the table maintenance logic, using the output select function 450.

For ease of programming the discriminator, there may be provided multiple masks and multiple and functions which can be selected by appropriate control signals from the CPU or the interpreting logic. Likewise, there may be multiple discriminating registers, and multiple comparators, to enable rapid reconfiguration, by simply selecting different ones of the registers or comparators, according to control signals from the host CPU or the interpreting logic.

A statistics reporting function 460 is also shown, for reporting, for example, numbers of packets and types of packets received, and number of successful recognitions, back to the host CPU. This may also report details of the current configuration of the discriminator back to the host CPU.

Figure 5:
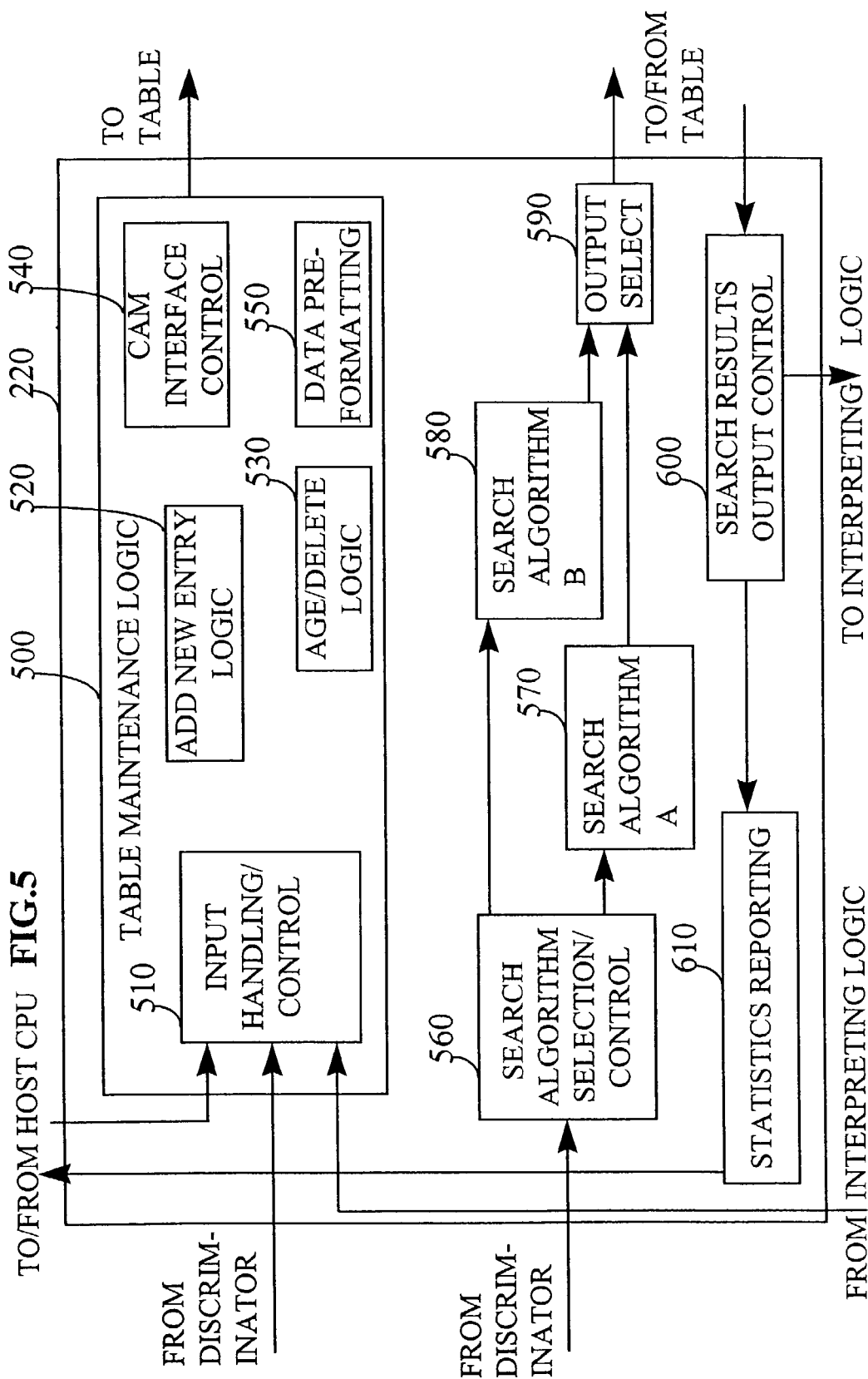
FIG. 5 shows an example of the programmable table search/maintenance logic of FIG. 3.

FIG. 5—Table Search/maintenance Logic Example

FIG. 5 shows logic for interfacing to the decision table, with two separate functions, table maintenance, and table search. The table maintenance logic 500 includes an input handling control section 510, for selecting and handling inputs from the host CPU, from the discriminator, and from the interpreting logic. Each of these may be allowed to change entries in the decision tables. Logic for controlling the addition of new entries is shown at 520. This may involve queuing new entry requests, or handling overflows of the table. Furthermore, it may involve controlling the data preformatting block 550. This involves ensuring the data received from the input handling/control block is suitable for the current configuration of the columns of the decision table.

Aging and deleting logic 530, is provided for controlling the deletion of table entries, and ensuring that in appropriate applications, old table entries are deleted after a certain time.

CAM interface control logic 540 is shown for the case where the decision table uses CAM. If RAM were to be used, then suitable interface logic would also be required. An appropriate op code for the different operations of adding a new entry or deleting an entry, need to be output to the CAM.

The table search logic may include several different search algorithms. If the table is stored in CAM, for a single stage search algorithm example, the level of programmability of the search may be limited to specifying which bits in which columns of the decision table are to be searched. For a more generic or flexible arrangement, a two stage search algorithm may be used, in which the selected bits are pre-processed before being fed to the matching field of the CAM.

A search algorithm selection/control section 560 determines which of two search algorithms 570, 580 are to be used. The selection may be made on the basis of the application, the nature of the packet, or the size of the table. An output selector 590 connects the chosen search algorithm to the table. If the table is a CAM, then an appropriate op code, and matching data, needs to be output to the CAM. The CAM returns matched output data, or a null result (for example in the form of high impedance output signals), to the search results output control logic 600. This may feed the results directly to the interpreting logic, and to a statistics reporting function 610, which reports back to the host CPU. The statistics reporting function 610 may also report to the host CPU on the current configuration of the table, the search algorithm, and other parameters.

Figure 6:
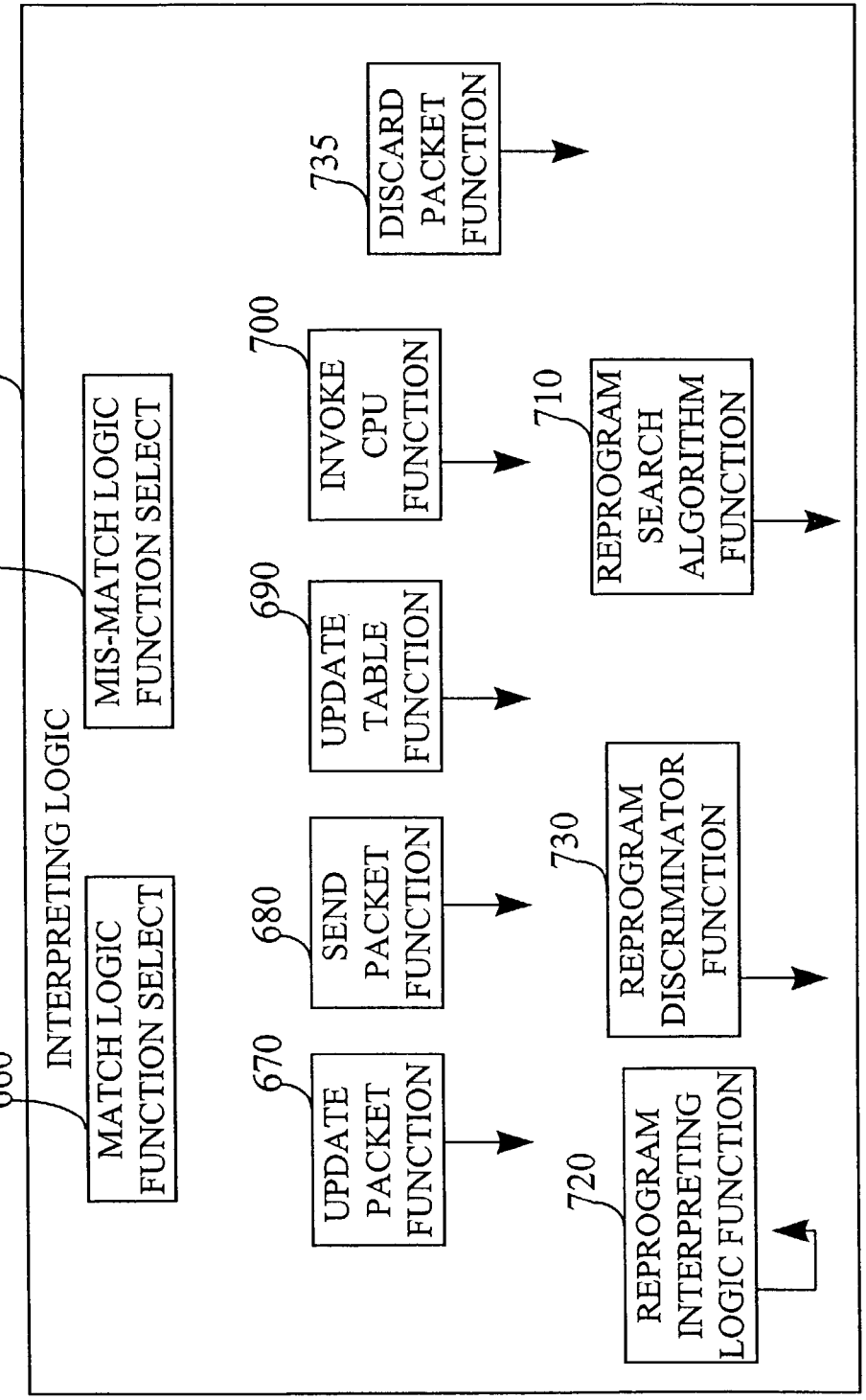
FIG. 6 shows an example of the interpreting logic of FIG. 3.

FIG. 6—Interpreting Logic Example

A variety of functions may be initiated and controlled by interpreting logic on the basis of the output of the decision table. A number of examples are shown in FIG. 6. Some or all of these functions may be triggered on a mismatch, and some or all may be triggered on a match. Mismatched logic function select 650 and match logic function select 660 may be used for distinguishing a match or a mismatch, and selecting an appropriate action, from a number of programmed possibilities. At 670, a packet update function is shown, for driving the packet buffers or the output line cards, to change some part of a packet, such as its destination or time stamp information. A send packet function 680 is shown, for directing the output packet buffers to send out the corresponding packet, to an output port corresponding to one of the line cards, which may be specified in the output field of the decision table.

A packet may be sent out on the basis of a matching result, or if there is a mismatch, a packet may be sent back to the originator of the incoming packet, or the packet may be broadcast to all output ports, depending on the application.

A table update control function 690 is shown, selectable either by the matched logic or the mismatched logic. In some cases, new table entries can be derived from information in incoming packets. The decision table may be updated directly without going through the host CPU or, in more complex cases, or less time sensitive applications, the table update function may invoke an appropriate process on the host CPU.

An explicit CPU process invocation function 700 is also shown, selectable by the mismatched logic, or by the matching logic.

A function for reprogramming the search algorithm 710 is shown, which would enable the decision table to contain entries to recognize packets intended to reconfigure search algorithms, perhaps to adapt them to different sizes of decision tables, for example.

A function for reprogramming the interpreting logic control 720 is also shown. This might enable further functions to be added, or disabled, or change the matching logic or mismatching logic, to change the function select criteria. This could be carried out by changing the contents of registers or by changing control lines, to alter the operation.

A further function, 730, enables the discriminator to be reprogrammed, again for example by changing contents of its registers, or changing control lines, to alter the logic. A packet discard function 735 is also shown.

The matched logic and mismatched logic will select an appropriate function based on the decision table output data, and perhaps dependent on other bits of the corresponding incoming packet. Any of the functions may be selectable either on a match or a mismatch, as desired.

For better programmability, the various functions could be implemented in the form of a single microcoded engine, having for example a four bit opcode, enabling up to sixteen different functions to be implemented. Many configurations for achieving this are conceivable and could be implemented within an FPGA, or using other types of programmable hardware.

Figure 7:
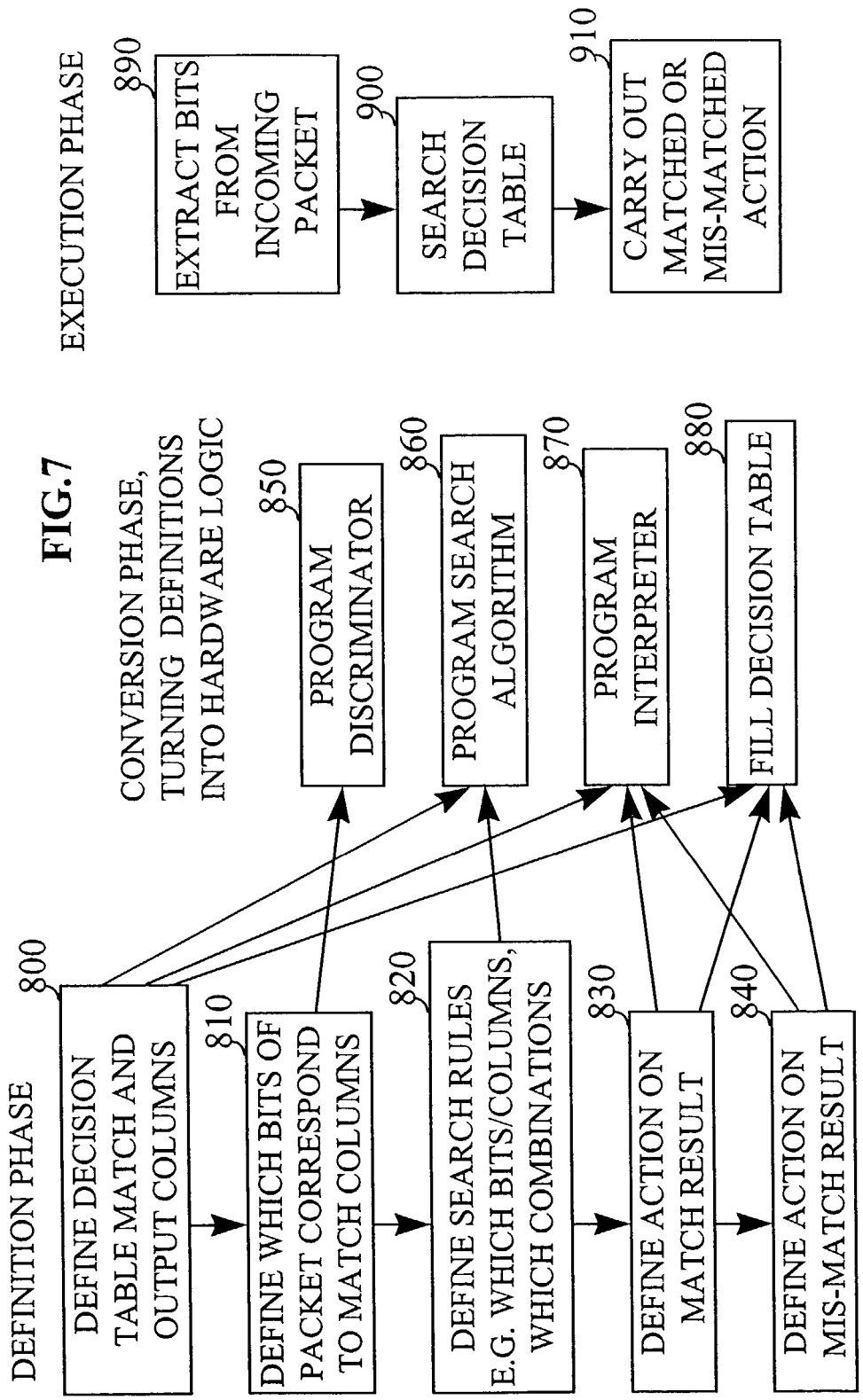
FIG. 7 shows method steps in a definition phase, a conversion phase, and an execution phase, related to the apparatus of FIG. 3.

FIG. 7—Phases of Operation

Three phases are shown, a definition phase, a conversion phase for turning definitions into hardware logic, and an execution phase. In the definition phase, a number of parameters are defined, either by a developer, or indirectly, by a remote network management system. At 800, the decision table columns for matching and output are defined. In the most straightforward case, this step may not be needed, if the decision table can be a straightforward look-up table using the matching bits to address the memory, or if the apparatus is limited by fixing the column structure of the table. However, this step will be necessary in more complex cases where matching is needed, or where the output is a pointer to a second stage of a search.

At 810, which bits of the packet correspond to which match columns in the table is defined.

At 820, search rules are defined, for example, which bits in which table columns are to be matched, and, if necessary, which combinations are these bits.

Action to be taken on a matching result for given inputs or outputs of the decision table is defined at 830. Corresponding action on mismatched results is defined at 840.

The conversion phase, turning these definitions into hardware logic, is described next. The outputs of this conversion phase are shown as follows. At 850, an output program for programming the discriminator is needed, which is based on the definition of which bits of the packet corresponds to the particular table columns. The program for the programmable search logic is produced at 860, based on the defined search rules, and based on the definitions of the table match and output columns.

A program for the interpreting logic 870 can be derived from the definition of decision table output columns, from the definition of matching results action, and from the definition of mis-match results action.

Finally, the decision table can be filled at 880, based on the definition of decision table match and output columns, on the definition of actions for a match result, and those for a mismatch. In some applications, there may be no need to fill the decision table initially, if it can be completely self learning.

Compilers suitable for turning high level definitions into compiled finite state machine (FSM) models for FPGAs, or code for microcontrollers or sequencers, are available, and will not be discussed in more detail here.

Loading of new code into such devices may require them to be taken off-line, which is feasible for development purposes, but may be a problem when reconfiguration is needed on apparatus in the field. One solution is to provide dual redundant devices, to enable "hot switching" between devices, so that while one is being programmed, the other is in operation and vice versa. This will be described in more detail below.

FIG. 7 also shows steps in an execution phase. At 890 bits are extracted from the incoming packet by the discriminator. At 900, the search logic is used to search the decision table. At 910, matched or mismatched actions are carried out on the basis of the result of the search of the decision table. Examples of the sorts of different actions which may be carried out have been described above in relation to FIG. 6.

Figure 8:
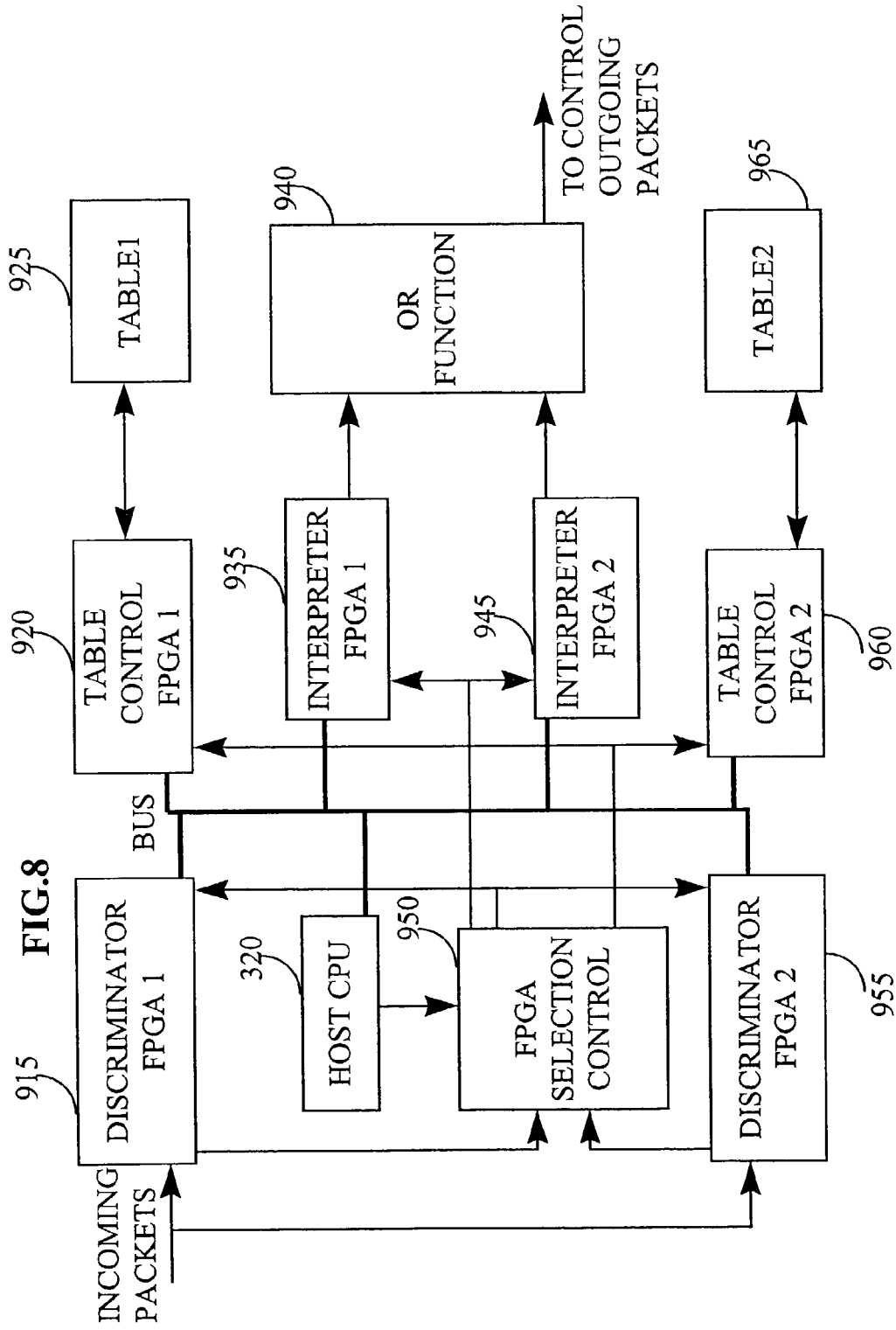
FIG. 8 shows another example of the apparatus of FIG. 2 with dual redundant.

FIG. 8—Dual Redundant Hardware Example

Separate FPGAs 915, 920 and 935 are shown for the discriminator, table control and interpreter functions. They are duplicated by a second set of FPGAs 945, 955 and 960. A decision table 1, 925 is shown for the first set of FPGAs, and a corresponding table 2, 965 is shown for the second set of FPGAs. An OR gate 940 allows one of the outputs from the duplicate interpreting logic functions 935 and 945, to be output to the rest of the system. A host CPU 320 is connected to all the FPGAs; to enable them to be programmed. A bus is provided between all the FPGAs to enable them to interact, by means of messages.

An FPGA selection control function 950 is provided, operating on the basis of inputs from the host CPU and from the two discriminator FPGAs. This has three outputs, one for each pair of duplicate FPGAs, to select one of the pair as the operative FPGA, while the other is off-line, to enable it to be reprogrammed. This selection control function determines when to switch between FPGAs, to ensure that switching takes place between packets, rather than in the middle of processing a given packet. The input from the host CPU can indicate when reprogramming is not complete. The inputs from the discriminators can indicate when a packet has been received, and is being processed. Other ways of ensuring switching takes place at the right time using inputs from other elements, can be conceived.

Various different levels of reprogramming of the programmable elements are possible, as will be described below with relation to FIGS. 9, 10 and 11.

Figure 9:
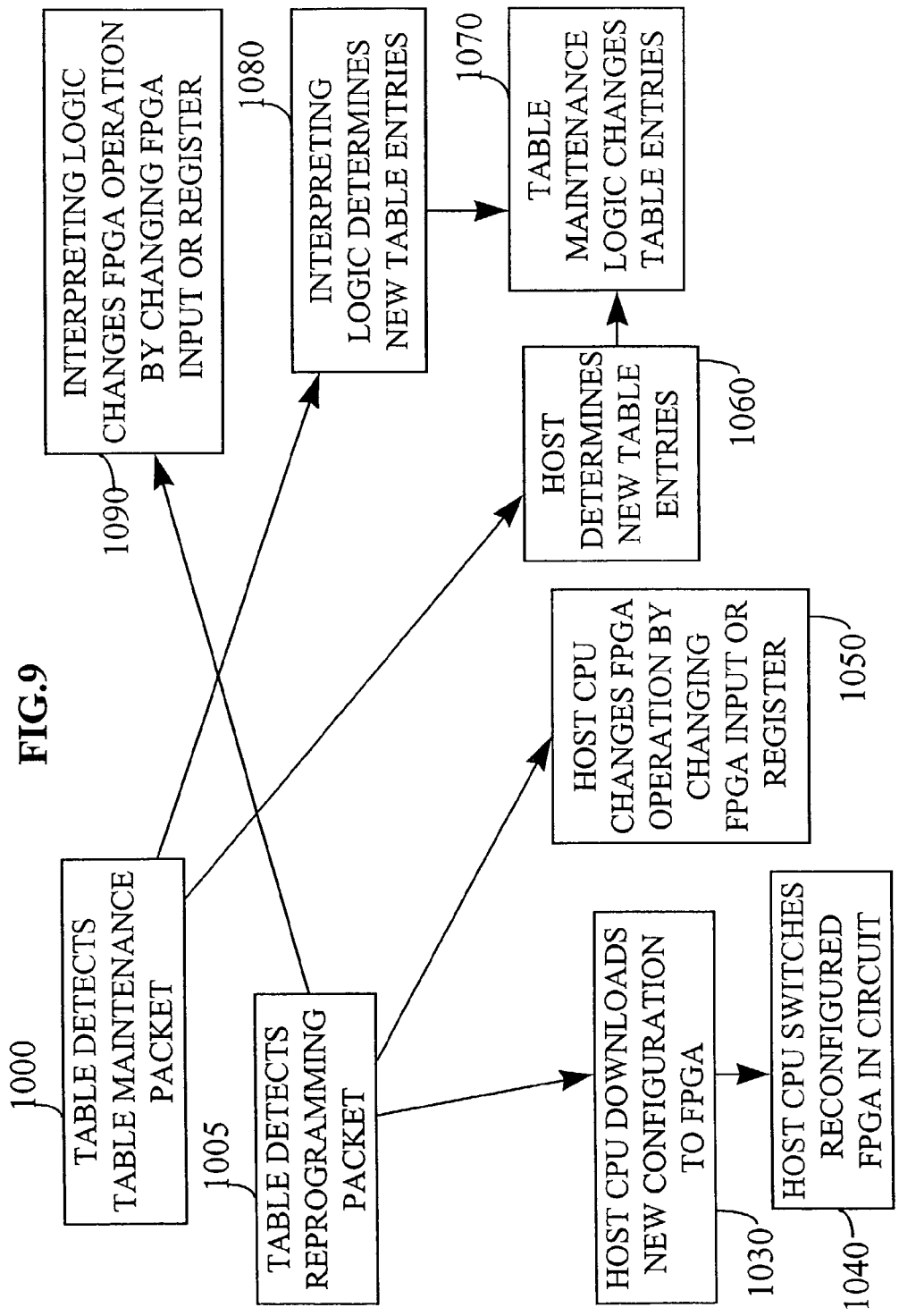
FIG. 9 shows alternative reconfiguration possibilities following a reconfiguration indication contained in one of the incoming packets.

FIG. 9—Reconfiguration Possibilities Triggered by a Table Match

FIG. 9 shows some alternative reconfiguration possibilities. At 1000, a search of the decision table produces a match on a packet which is intended to indicate a table maintenance operation. At 1060, reconfiguration is carried out by means of new table entries for the decision table. The host CPU determines the new table entries and the table maintenance logic carries out the changes at step 1070. The table entries may be changed without reference to the host CPU as shown in step 1080, where the interpreting logic determines the new table entries and passes them to the table maintenance logic.

At 1005, a search of the decision table produces a match on a packet which is intended to indicate a reprogramming operation for one or more of the programmable hardware elements. At 1030, the host CPU is alerted, via the interpreting logic. The host CPU downloads the new configuration to an appropriate FPGA or FPGAs. At 1040, the host CPU switches the reconfigured FPGA into the circuit. An alternative is shown at step 1050, where the host CPU changes FPGA operation not by downloading a completely new configuration, but merely by changing an FPGA input or register. In a further alternative, the interpreting logic could change the operation of any of the FPGAs without reference to the host CPU, by changing an FPGA control input or the contents of a register in the FPGA.

The packets which trigger a reconfiguration, either by changes in the decision table contents, or by reprogramming the hardware, may be sent by a network management system for that purpose, or may be packets containing data to be carried across the network, but carried in a format which prompts the reconfiguration.

Figure 10:
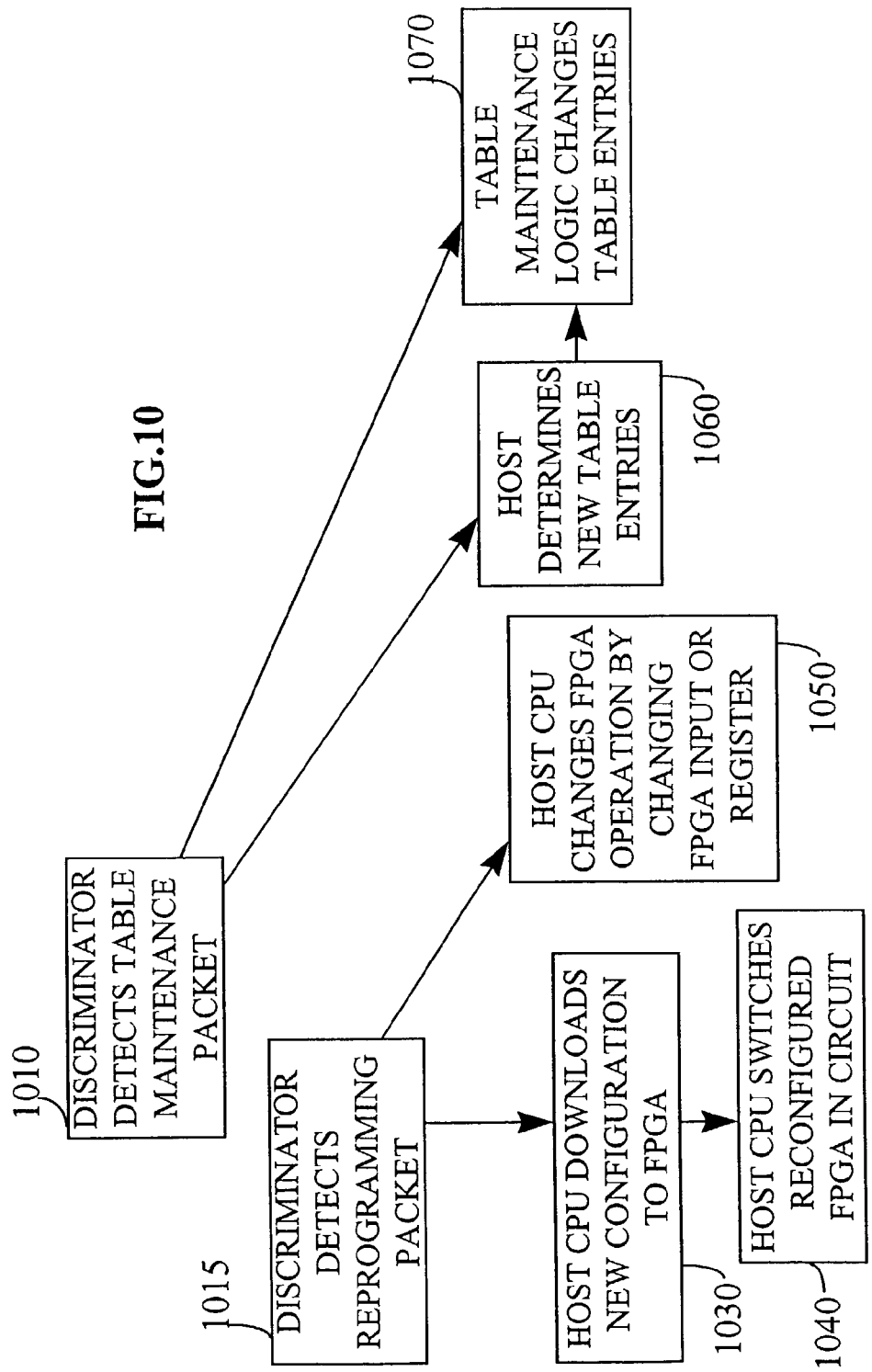
FIG. 10 shows a number of reconfiguration possibilities following detection of a reconfiguration indication in an incoming packet, by the discriminator.

FIG. 10—Reconfiguration Triggered by the Discriminator

Where the discriminator contains recognition circuitry, as described in relation to FIG. 4, it may detect packets which are intended to trigger changes in the table, at 1010. As described above, the host CPU may determine new table entries at 1060, or the discriminator may trigger changes in the decision table at 1070 without reference to the host CPU. An example of a network management packet which might trigger a routing table change in local area network routing is a RIP (Routing Information Protocol) packet used for advertising routes.

If the discriminator detects packets which are intended to trigger reprogramming of the hardware, as at 1015, this may cause the host CPU to download a new configuration to one or more of the FPGAs, at 1030 and 1040. Alternatively, the host CPU may change the FPGA operation by changing an input or a register, at 1050.

Figure 11:
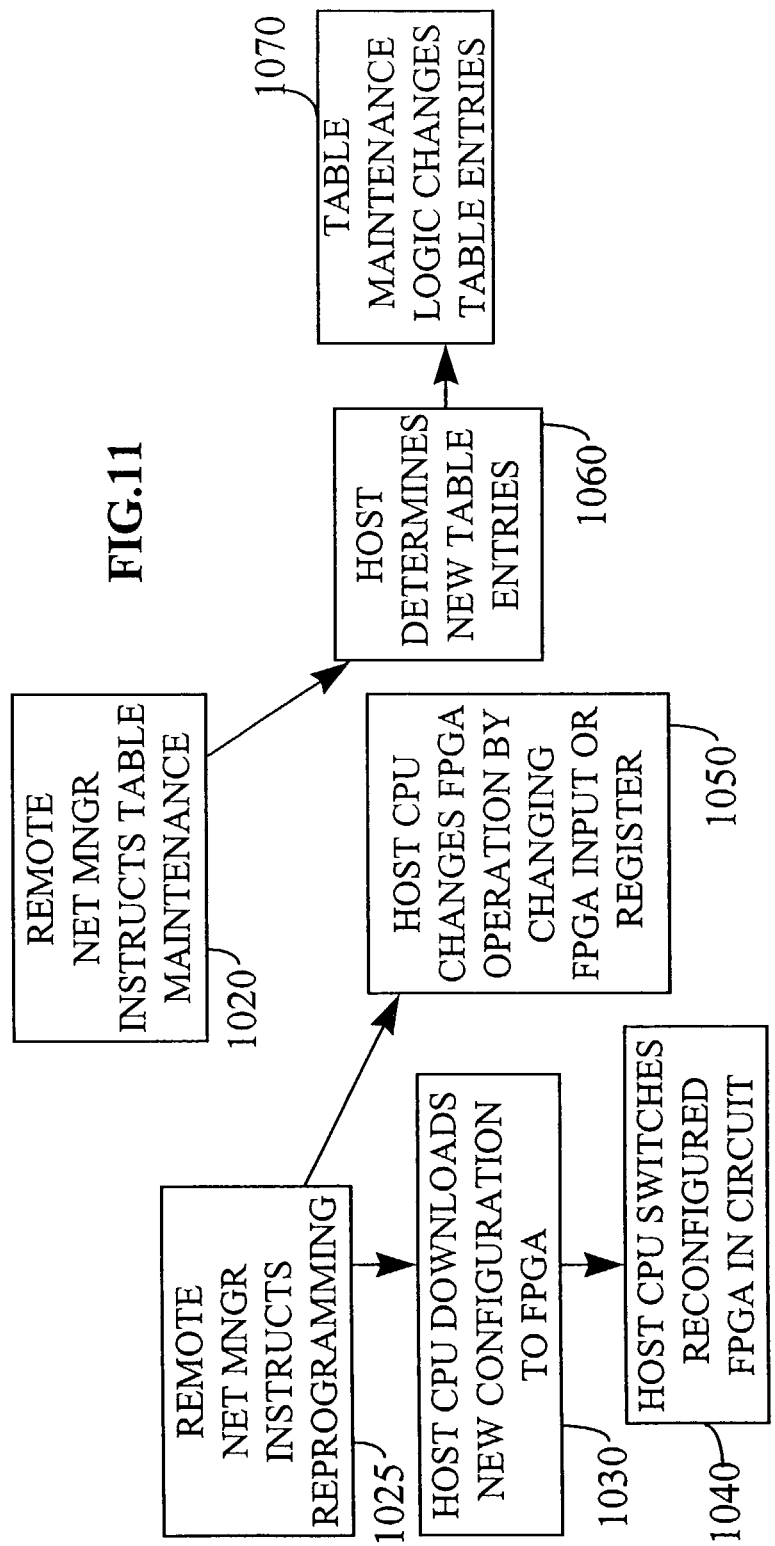
FIG. 11 shows a number of reconfiguration possibilities initiated by an instruction from a remote network management system to the host CPU.

FIG. 11—Reconfiguration Possibilities Initiated by a Remote Network Manager

FIG. 11 shows how a remote network manager may instruct a reconfiguration, either by a table maintenance instruction 1020, or by a reprogramming instruction 1025. In either case, the instruction may be sent by sending a packet across the network, or conceivably by a distinct management communication path (not shown). As described above, the packet can be passed to the host CPU which can thereby be instructed to download a new configuration to any of the FPGAs at 1030. Alternatively, the host CPU can change FPGA operation by changing an input or a register at 1050, or change table entries at 1060, using the table maintenance logic at 1070.

Figure 12:
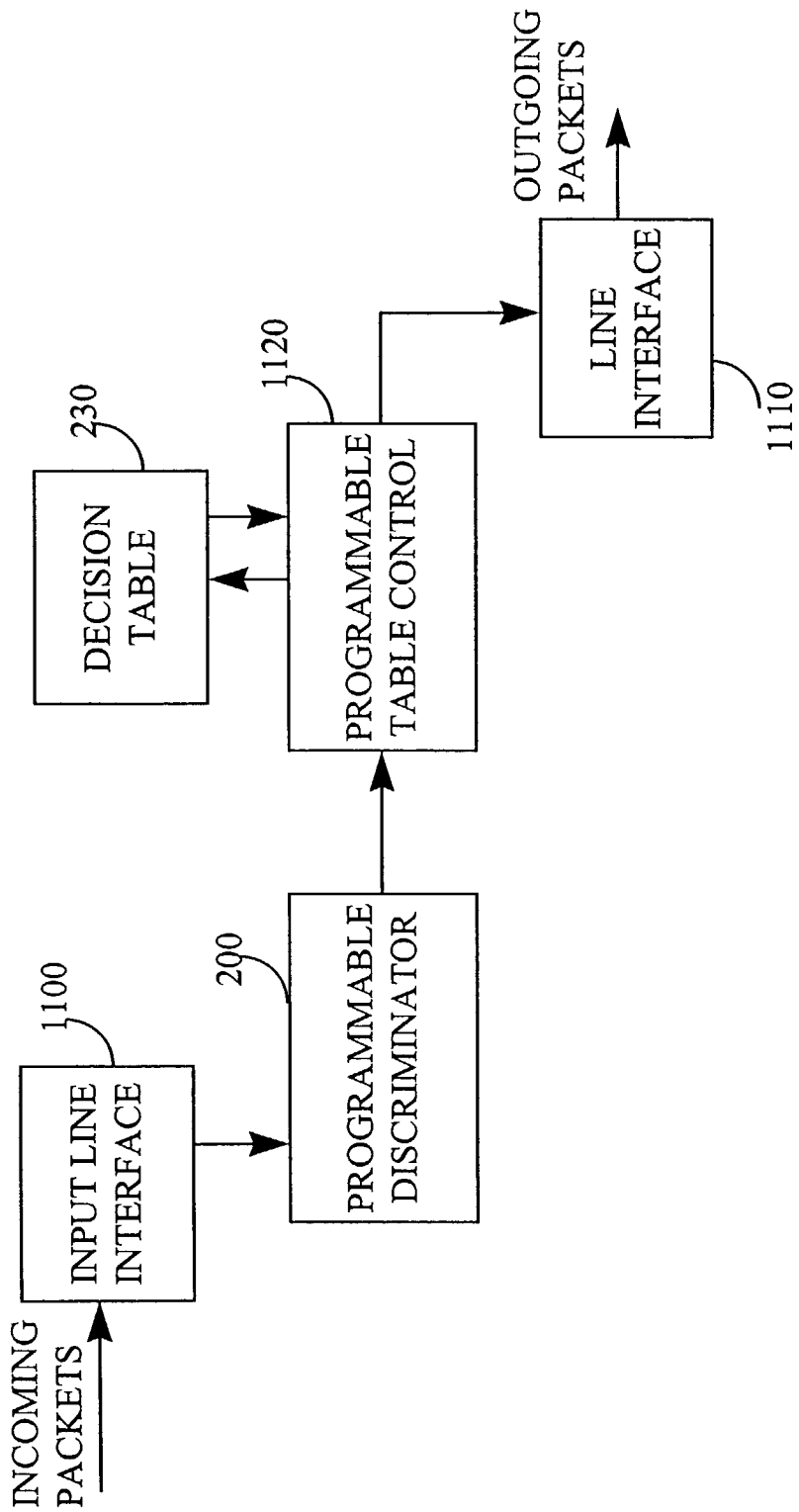
FIG. 12 shows an example of the apparatus of FIG. 2, suitable for filtering or conditioning a stream of packets.

FIG. 12—Packet Filter/Conditioner Example

FIG. 12 shows some of the principal elements in a packet filter/conditioner. An input line interface 1100 feeds the discriminator 200, the decision table 230, and table control function 1120, including search, maintenance, and interpretation of search results. A line interface 1110 is arranged to output or reject or amend packets as appropriate, on the basis of the search result, and the contents of the decision table as described above. Such apparatus may be used for firewall purposes, or admission control, or IP traffic conditioning for example. In the traffic conditioning example, packets may be rejected if the user is exceeding his negotiated bandwidth, and a shaping algorithm may be used to limit the excess bandwidth used by a user beyond what was negotiated. In this case, the decision table would contain as input columns, source and destination IP address and ports, protocol type, (TCP or UDP for example,) and allocated bandwidth. If there is a match, then a calculation can be made as to how much of the allocated bandwidth has been used. This may be carried out in the host CPU, for example. The host CPU could update an output column in the table to indicate when a given source has used all its allocated bandwidth in a given time window. Then this output column could be used to control the line interface directly, in the case of a match, to prevent any more packets going from that source to the given destination, until the next time window.

Another application for the arrangement of FIG. 12 would be in converting packets between formats or translating network addresses. Other applications needing only a single input and output for packets can be envisaged.

Although the arrangement of FIG. 12 has a single input and a single output, and needs no switching function, clearly such applications which do not use switching, could be implemented in combination with switching functions, using the same programmable hardware elements described above. In such cases, the decision table may contain routing information as well as filtering information.

Figure 13:
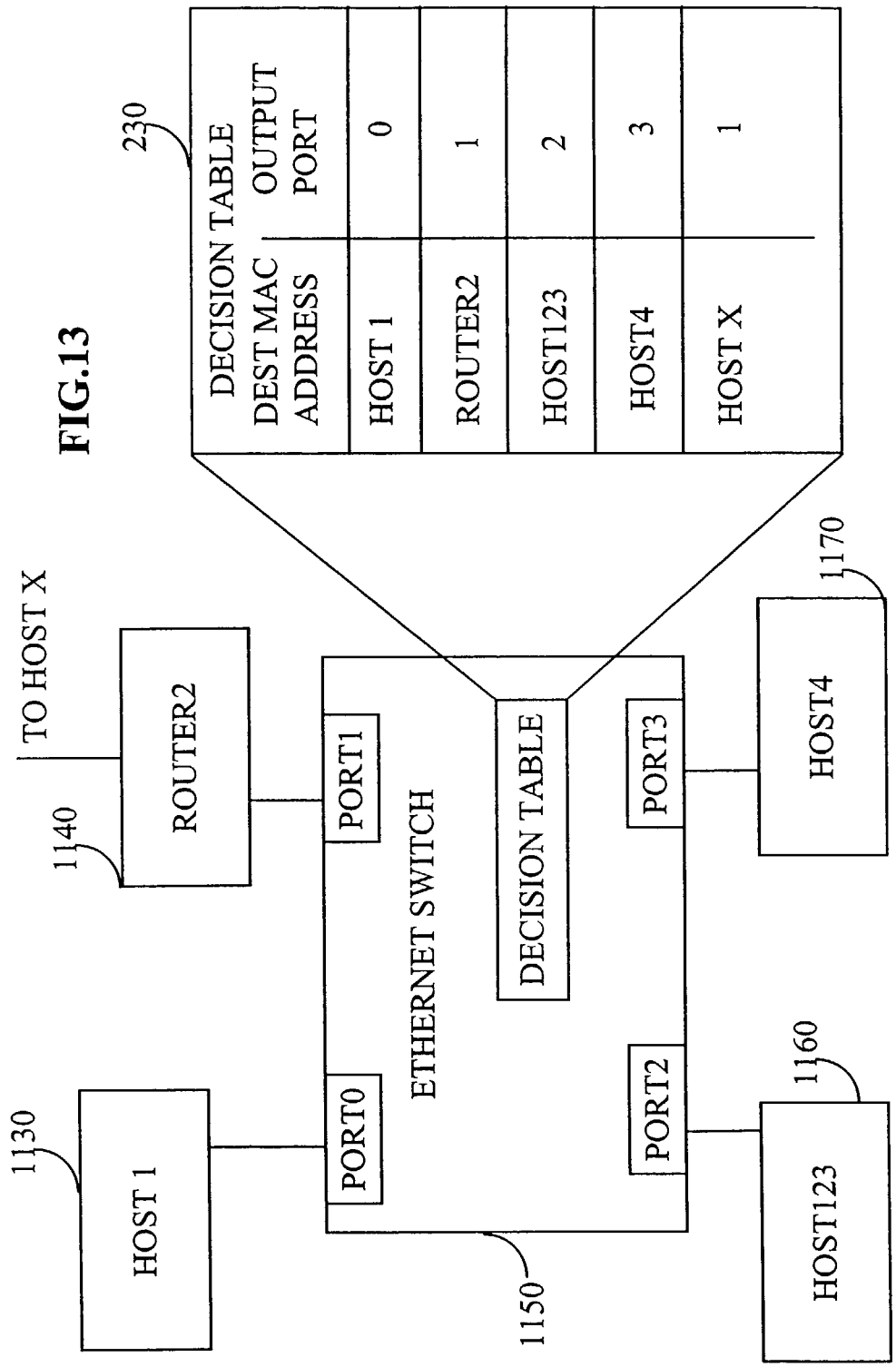
FIG. 13 shows an example of applying the apparatus of FIG. 2 to an Ethernet switch.

FIG. 13—Ethernet Switch Example

FIG. 13 shows a simplified example of an Ethernet switch 1150, for interconnecting a number of hosts, and a router. Not shown for the sake of clarity are virtual LAN and Spanning Tree algorithms. The apparatus as shown in FIG. 2 or 3 could form part of the Ethernet switch. Only the decision table is illustrated. In practice there may be many ports on the switch, only four are shown—ports 0 to 3. Port 0 is connected to host 1, 1130, port 1 is connected to router 2, 1140, which also connects host X also. Port 2 is connected to host 123, 1160, and port 3 is connected to host 4, 1170.

The decision table 230 is illustrated in expanded form to show its contents. A matching column on the left contains the destination MAC for each of the entities visible to the Ethernet switch. The right-hand column of the table contains the output port on which a packet would be output to reach the given destination set out in the left-hand column.

In this case the matched action would be to send the incoming packet to the output port specified in the output of the table when the search is carried out.

The mismatched action would be to create a new table entry with the source MAC address in the left-hand column, and the right-hand column would specify the port on which the packet was received. This takes advantage of the fact that Ethernet packets specify the source address of the packet. Therefore, if the Ethernet switch was previously unaware of that originating host, and had no table entry for it, it can create a new table entry, for use by any packets which might be sent back to that originating host.

A further mismatched action would be to broadcast the incoming packet to all output ports to try to ensure that it reaches its destination, even though there is no entry in the decision table for that particular destination.

An example of pseudo-code for configuring the table and the programmable hardware elements, might be as follows (where % indicates a comment). This particular example uses an index which is efficient in a LAN environment where all NICs (Network Interface Cards) are from the same manufacturer. This means the first three bytes of the ethernet address will always be the same, and so the search algorithm can be tailored to ignore these bytes.

Program the Discriminator

% datafill register (only interested in one)
F0:{0,48,1}
%this says extract starting offset 0 for 48 bits to
% be compared with column 1 (table columns start at 1, 0 is a
% special case which means no comparison needed)
%
% Information passed down to the search is:
%val: the extracted bits
%inport: the port the data came through
%col: table column to compare with (in this case 1)
%

Program Table Search/Maintenance Logic

Figure 14:
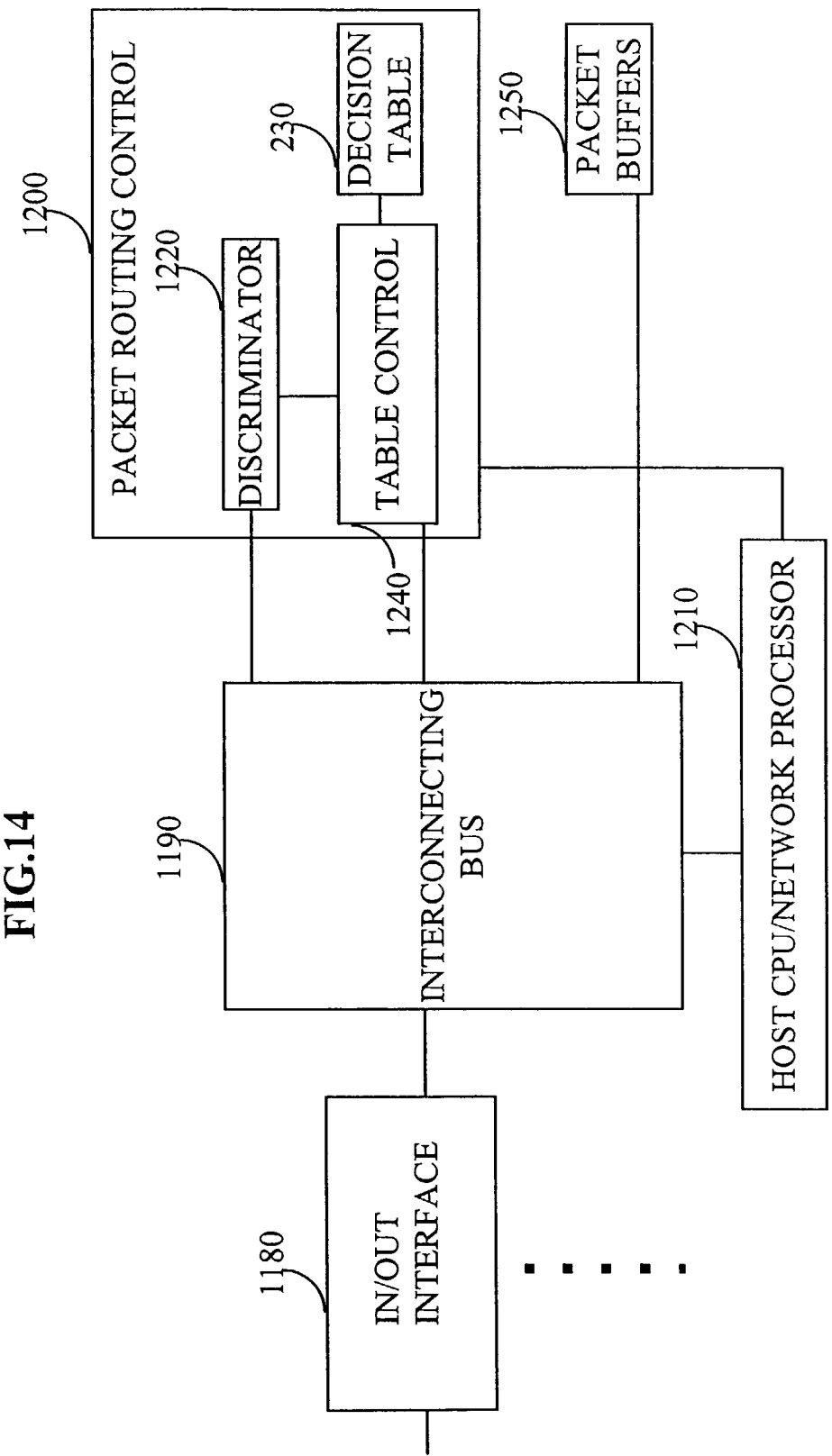
FIG. 14 shows an example of the apparatus of FIG. 2, applied to an IP router.

ASSIGN index val[4]<<8|val[5]
%The above is an example of an index which is part of a search
%algorithm. It takes only the last 16 bits of the 48 bit ethernet
% address extracted by the discriminator for use as an index
% for table searching operations eg in add, delete operations
%This particular index is efficient in a LAN environment where
% all NICs are from the same manufacturer
%If the table is implemented using fast RAM, the index could be
% used to generate an address in the RAM.
% the line below is how the index is used to find and output a
% table row
ASSIGN row search(index,MAC)
% the search statement uses the index to access the table location
% and uses the entire MAC address only if necessary e.g. where
% the index points to more than one entry. The row is passed
% down to the interpreting logic; it is NULL if
% the search failed to produce anything Program the Interpreting Logic % Define the matched action
MatchedAction:
REPLACE exitport with row.outport
SEND to exitport
END MatchedAction
% Define the not matched action; simple case assuming entry not
% in table already
NOT MatchedAction:
CREATE table_entry new_entry
ASSIGN new_entry.MAC bits 48-95
ASSIGN new_entry.outport inport
SEND to allports !=inport Each of the programs after being compiled is downloaded to the apparatus before the specific code is activated FIG. 14—IP Router Example FIG. 14 shows a configuration for an IP router. A bus 1190 interconnects a number of in/out interfaces, of which one is shown, 1180. A packet buffer 1250 is connected to the bus for storing packets which enter on one of the in/out interfaces, but are to exit on another. A packet routing controller 1200 controls the interconnection of the packet buffer and the in/out interfaces. This controller is an application for the programmable hardware described above. The controller includes a decision table 230, a discriminator 1220, and table control logic 1240. A single host CPU/network processor 1210 is provided for housekeeping purposes, for overall management, and for downloading table entries and reprogramming hardware elements of the bus controller.

Incoming packets may be switched and sent out again by a single one of the in/out interfaces, or it may be sent to the packet buffer 1250. The packet or just the IP header of the packet are sent to the controller for routing. The discriminator which corresponds to the programmable discriminator described above in relation to FIG. 4 may feed selected bits to the table control function 1240. This corresponds to the table search, and table maintenance functions described above with reference to FIG. 5.

The table control function 1240 may feed destination information obtained by the discriminator from the packets, such as destination IP address, and destination IP port, into the decision table 230 according to an appropriate search algorithm. The decision table, which operates as a routing table, will output an indication of which of the in/out interfaces the packet should be routed to. This routing indication can be used straight away or can be stored for use when the corresponding packet reaches the top of whatever type of queue is used in the packet buffer. The routing indication can be used to control the bus access to enable the packet to be written onto the bus and read from it into the correct in/out interface.

In this example, the output of the table can be used directly, and is used for only one purpose so there is no need for interpreting logic. The bus and in/out interfaces are one example of a packet handler for processing the packets according to the result of the table access. Interpreting logic might be useful if it is desired to define action which should be carried out in the event of a mismatch. Alternatively, such mismatch actions could be carried out by notifying the host CPU and having the CPU carry out the action.

The function of a router is to determine the next hop for each packet, for given destinations. As this decision may change, as particular links become overloaded, or as a result of failure, new routing tables may be determined by the network processor 1210, and downloaded to each of the in/out interfaces as required. As the discriminator 1220 can easily be reprogrammed, changes in protocol can be handled by reprogramming, without needing to change the hardware. Furthermore, if the function of the router were to be changed from being a backbone router to an edge router, based on traffic characteristics, as might be desired in an active network, again, such changes could be made by reprogramming without having to change the hardware. Since an edge router will exhibit much more localized traffic than a backbone router, it may be appropriate to change its algorithms for the table search, to change the table maintenance criteria, and to change the packet forwarding criteria.

Such a reconfiguration could be triggered based on local measurements of traffic, or the traffic analysis and a switchover decision could be made on a remote host from RMON/SNMP traces. It could be carried out using the network processor as a host.

In this example, if IPv4 is used, there are 32 bits in the address, and the table could be implemented in fast (e.g. 10 nsec access is available) RAM, and addressed directly in a one stage search. If IPv6 is being used, there are 128 bits in the address and so a two stage search algorithm might be appropriate.

Other configurations for the router are conceivable to provide faster processing, or greater capacity, the above example is for illustrative purposes only.

Other Application Examples

In a firewall application for IPV4, the table could be defined as including columns for matching bits for the source IP, the source port number, the destination IP address, the destination port number, and the IP protocol field in the IP packet. The matched action could be to consult a routing engine on the host CPU to determine the appropriate output port. The mismatched action could be to send an ICMP (Internet Control Message Protocol) unreachable message to the source IP. The unsuccessful attempt to get through the firewall could be recorded, then the packet discarded.

Another application would be for a router bypass device, which learns the router table by analyzing packets going into and out of the router, then builds up its own routing table, and switches packets for recognized destinations so as to avoid the router, and ease any congestion.

Other Matters and Other Variations

Although for simplicity of explanation, the programmable elements are shown as handling one packet at a time, to achieve greater throughput, the various elements should be pipelined, and should have multiple paths to enable them each to concurrently handle more than one packet. Blocking and contention issues may arise, as would be well known. As there are various approaches following well-known principles, there is no need to discuss these issues further here.

As can be seen, the information in the decision table relating to how the packets are to be processed, can encompass both information on how the present incoming packet is to be processed, and information relating to reconfiguration of the programmable hardware elements to enable future incoming packets to be processed differently.

Other variations within the scope of the claims will be apparent to persons of average skill in the art, and are not intended to be excluded.

What is claimed is:
1. Apparatus comprising:
a network device which processes a first packet before being reprogrammed and processes a second packet which is identical to the first packet after being reprogrammed, including:

a reprogrammable hardware discriminator which receives the first packet and selects a first set of bits from the received first packet;
a reprogrammable decision table which stores information relating to how packets are to be processed;
reprogrammable hardware searching logic which accesses first information in the table associated with the received packet according to the selected first set of bits;
reprogrammable interpreting logic which determines how to process the packet based on information in the table corresponding to the selected first set of bits; and
a packet handler which processes the first packet as determined by the interpreting logic;
the network device being reprogrammed in response to signaling from another device such that the hardware discriminator selects a second set of bits from the second packet which is identical to the first packet, where the first set of bits is different than the second set of bits.

2. The apparatus of claim 1, the interpreting logic being arranged to react to both a match and a mismatch result between the selected bits and the information in the table.

3. The apparatus of claim 1, the programmable hardware searching logic being arranged to be reprogrammable while in operation without interrupting the accessing of the information in the table.

4. The apparatus of claim 1 further comprising a table maintenance means coupled to the decision table to modify the decision table according to parameters derived from the incoming packets.

5. The apparatus of claim 4, the table maintenance means comprising programmable hardware logic for deriving the parameters from the incoming packet.

6. The apparatus of claim 5, the discriminator further comprising a comparator for receiving the incoming packets, and comparing at least a portion of each packet with predetermined data, to identify particular types of packet from the incoming packets, the table maintenance means being coupled to the comparator and being arranged to modify the decision table on the basis of an output of the comparator.

7. The apparatus of claim 4, further comprising at least one packet output port, and the packet handler comprising programmable hardware interpreting logic coupled to the packet output port, for interpreting the result of the access, to control the packet output port, the table maintenance means being coupled to the interpreting logic, and being arranged to modify the decision table on the basis of an output of the interpreting logic.

8. The apparatus of claim 4, further comprising a host processor, the table maintenance means being coupled to the host processor and being arranged to modify the decision table on the basis of an output of the host processor.

9. The apparatus of claim 1 the discriminator further comprising a comparator for receiving the incoming packets, and comparing at least a portion of each packet with predetermined data, to identify particular types of packet from the incoming packets, and process the packet according to its type.

10. The apparatus of claim 1, the programmable hardware searching logic being arranged to access concurrently the information in the table relating to a plurality of the incoming packets.

11. The apparatus of claim 1, the packet handler further comprising a packet switching fabric.

12. A programmable packet filter comprising the packet processing apparatus of claim 1.

13. A programmable node in an active network comprising the packet processing apparatus of claim 1.

14. An apparatus comprising:
a network device which processes a first packet before being reprogrammed and processes a second packet which is identical to the first packet after being reprogrammed, including
a reprogrammable hardware discriminator which receives the first packet and selects bits from the first packet, a reprogrammable hardware table processor coupled to the discriminator and comprising a decision table containing information relating to how packets are to be processed, the processor further comprising reprogrammable hardware searching logic for accessing the information in the table according to the selected bits;
reprogrammable interpreting logic for determining how to process the packets based on information in the table corresponding to the selected bits;
a packet handler which processes the first packet by modifying the decision table according to parameters derived from the first packet;
the network device being reprogrammed in response to signaling from another device such that the interpreting logic and packet handler process the second packet differently than the first packet.

15. A method of operating a network device comprising:
processing a first packet before being reprogrammed by:
with a reprogrammable hardware discriminator, receiving the first packet and selecting a first set of bits from the first packet;
with a decision table containing information relating to how the packets are to be processed and reprogrammable hardware searching logic coupled to the decision table and to the discriminator, accessing the information in the table according to the selected first set of bits; and
processing a second packet which is identical to the first packet after being reprogrammed by:
with the reprogrammable hardware discriminator, receiving the second packet and selecting a second set of bits from the second packet, where the first set of bits is different than the second set of bits;
with the decision table containing information relating to how the packets are to be processed and the reprogrammable hardware searching logic coupled to the decision table and to the discriminator, accessing the information in the table according to the selected second set of bits.

16. A method of operating a network device comprising:
processing a first packet before being reprogrammed by:
using the reprogrammable hardware discriminator to receive the first packet and select bits from the first packet;
using the reprogrammable hardware searching logic to access information in the decision table according to the selected bits; and
using the reprogrammable packet handler for processing the first packet according to the information; and
processing a second packet which is identical to the first packet after being reprogrammed by:
using the interpreting logic and packet handler to process the second packet differently than the first packet.

* * * * *